United States Patent [19]

Manz

[11] 3,809,853
[45] May 7, 1974

[54] METHOD FOR SHORT CIRCUIT METAL TRANSFER ARC WELDING

[75] Inventor: August Frederick Manz, Union, N.J.

[73] Assignee: Union Carbide Corporation, New York, N.Y.

[22] Filed: Aug. 24, 1972

[21] Appl. No.: 283,343

[52] U.S. Cl............................ 219/137, 219/131 F
[51] Int. Cl............................................. B23k 9/10
[58] Field of Search............ 219/131, 137, 130, 74, 219/76

[56] References Cited
UNITED STATES PATENTS

| | | | |
|---|---|---|---|
| 3,423,564 | 1/1969 | Seuenco | 219/131 R |
| 2,486,165 | 10/1949 | Journeaux | 219/131 R |
| 2,315,625 | 4/1943 | King | 219/131 R |
| 3,250,894 | 5/1966 | Manz | 219/131 R |
| 3,459,920 | 8/1969 | Seuenco | 219/131 R |
| 3,249,735 | 5/1966 | Needham | 219/131 R |

Primary Examiner—J. V. Truhe
Assistant Examiner—George A. Montanye
Attorney, Agent, or Firm—Eugene Lieberstein

[57] ABSTRACT

The method and system of the present invention minimizes weld spatter through control of the short circuit current and through control over the short circuit and arc time intervals.

3 Claims, 4 Drawing Figures

METHOD FOR SHORT CIRCUIT METAL TRANSFER ARC WELDING

This invention relates to a power supply system and method for metal arc welding and more particularly to an improved method and power supply system for work-in-circuit metal arc welding wherein metal is transferred to the work during short circuit intervals.

Short circuit metal transfer arc welding is characterized by a series of repetitive short circuits between the consumable electrode wire and the workpiece. In the conventional system, as soon as the electrode comes into physical contact with the workpiece the current increases at a rapid rate until sufficient energy is generated to electromagnetically break the molten bridge connecting the end of the electrode and workpiece. The level to which the current rises, until the short circuit is forcibly broken, will hereinafter be referred to as the electromagnetic surge current level. The break is accompanied by a sudden release of substantial energy causing liquid metal to disperse about the work area, known in the art as spatter, which is not only wasteful of weld metal and difficult to clean up but also gets into the interior of the torch and eventually clogs it.

Substantial effort has been expended to eliminate weld spatter or to at least reduce it to within manageable limits without otherwise affecting operational performance. One method which has met with partial success is taught in U.S. Pat. No. 3,275,797 issued in the name of August F. Manz. The method as taught therein involves controlling the short circuit current by limiting the magnitude thereof at the instant of short circuit metal transfer to a value less than the arc current. By this teaching, since the short circuit current is presented from rising to the electromagnetic surge current level, insufficient energy is present to permit explosive liquid metal vaporization. Instead, metal transfer is intended to take place solely through surface tension and gravity. The method was proven a success in terms of eliminating spatter but was too erratic in operation for practical implementation.

The present invention is an improvement over the aforementioned patent providing the advantage of substantially reduced spatter while maintaining highly reliable and consistent welding performance. Moreover the present invention permits adjustable control over the arc energy and as such the heat input to the weld thereby providing control over weld pool fluidity.

Broadly speaking the method of the present invention is carried out by monitoring the current magnitude during preferably both the arc interval and the short circuit interval such that (a) should the arc interval extend past a reference arc time interval the current magnitude would be reduced to a predetermined level until a short circuit is established; (b) limiting the current magnitude at the short circuit metal transfer instant to below the electromagnetic surge current level; and by (c) should the short circuit time interval extend past a reference short circuit time interval raising the current to the required electromagnetic surge current level to clear the short circuit.

Advantages of the present invention will become apparent from the following complete description of the invention when taken in connection with the accompanying drawings of which:

Figure 1:
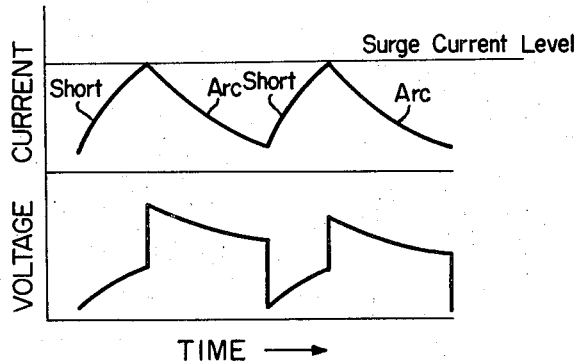
FIG. 1 illustrates typical current and voltage versus time traces respectively for the conventional short circuit metal transfer arc welding process.

The conventional short circuit metal arc transfer process is exemplified through its voltage and current versus time characteristics shown in FIG. 1. At the transition instant when the electrode physically contacts the workpiece shorting out the power supply, the voltage will drop to near zero and the current will climb unrestricted until the molten bridge connecting the electrode and workpiece is broken. The rate of current rise is limited only by the internal reactance of the power supply and any auxiliary reactance in series with the supply. When the short is cleared the voltage jumps to full open circuit voltage, or slightly above due to the reactance, reigniting the arc. The minimum current necessary to forcibly disconnect the molten bridge is determined by many factors including current density, arc energy as well as through the influence of gravity and surface tension etc., but is always above at least about 300 amperes ±50 amperes.

The present invention fundamentally alters the conventional process by limiting the magnitude of the current at short circuit to a predetermined value below the "electromagnetic surge current level," indicated above as being around 300 amperes minimum, except under certain circumstances to be explained hereafter. The current surge level can be established for any given welding set-up by simple measurement. Moreover, the present invention provides for monitoring the arc and short circuit time intervals permitting adjustment of the arc energy and heat input to the weld to insure a welding performance at least equal to the performance obtained using the conventional process but with only a minimum of spatter.

Figure 2:
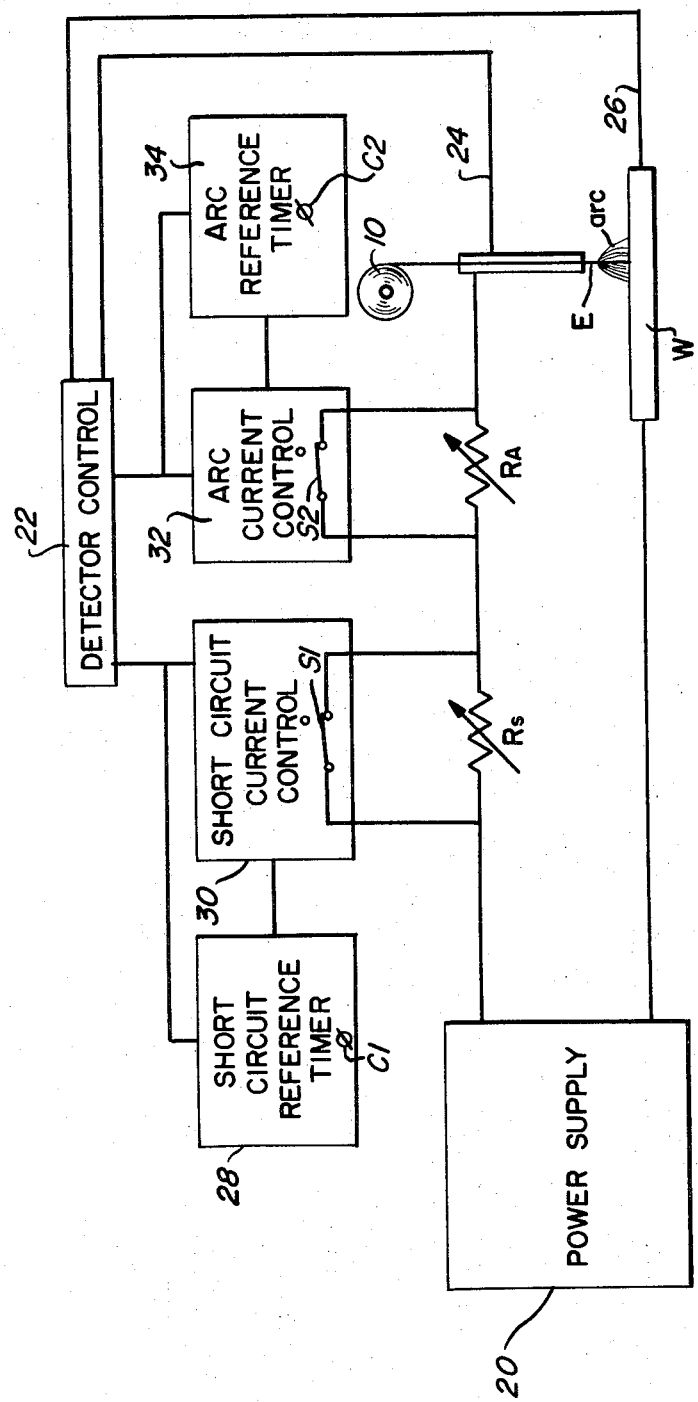
FIG. 2 is a schematic diagram of the power supply system of the present invention in circuit with an electrode and workpiece.

Referring now to FIG. 2 in which a consumable electrode E is shown fed from a reel 10 towards a workpiece W to be welded. The power supply system includes, by way of example, a conventional welding power supply 20 connected between the electrode E and workpiece W in series circuit relationship with two resistors $R_A$ and $R_S$ respectively.

A detector control circuit 22 is connected across the electrode and workpiece through feedback leads 24 and 26 respectively for sensing the short and arc condition. An output pulse is simultaneously applied to circuits 28, 30, 32, and 34 respectively at each transition instant of time from short circuit to an arc and vice versa. Detector circuits for differentiating between a short and open circuit are quite conventional. The short circuit and arc current control circuits 30 and 32 respectively, are symbolically represented by functionally equivalent switches S1 and S2 respectively. The switches are connected in their normally closed position across resistors $R_S$ and $R_A$ respectively. Although switches are shown for purposes of simplicity, the control circuits preferably include solid state devices such as silicon controlled rectifiers which are controlled through conventional logic circuitry. The switches are activated in response to the output from the detector control 22 as well as from the outputs of circuits 28 and 30 respectively, in a predetermined sequence to be explained hereafter. It should be understood that although the specific logic circuits are not shown, such circuitry is well within the expertise of electronic engineers skilled in the art of logic design. Moreover, many alternative circuit techniques may be used to activate switches S1 and S2 as required in accordance with the present invention. For example, an operational amplifier may be used to provide a two mode polarity output for the detector control 22 such that a positive polarity output represents the shorted condition and a negative polarity output the open or arc condition. The positive output may thus be applied to enable the short circuit current control 30 for opening switch S1. When the output of detector control 22 reverts to a negative polarity representing the transition from the short circuit to the arc condition the current control circuit 30 would then be disabled i.e., switch S1 would return to its normally closed position. The short circuit time duration is limited by the short circuit reference timer 28. If the short has not cleared within a predetermined reference time period set by the adjustable control C1, the reference timer 28 provides an output clear pulse to the short circuit current control 30 returning switch S1 to its normally closed position. The current supplied by the power supply 20 will then sharply rise in the conventional manner until the short is broken.

Once the short circuit is cleared full open circuit voltage is available from the power supply 20 to reestablish an arc. The arc time duration is controlled by means of the arc reference timer 34. If the shorted condition has not been reestablished within a predetermined time interval set by the adjustable control C2, and reference timer 34 provides an output to enable arc current control 32 thereby transferring switch S2 to the open position and placing resistor $R_A$ into the welding power supply circuit. The arc current control 32 is responsive to the outputs from both the detector control 22 and the arc reference timer requiring the concurrence of both to open switch S2. With $R_A$ in circuit, the power supply current will decrease to a predetermined level causing the immediate reoccurrence of the shorted condition. The detector control 22 upon sensing the short reverses its output back to a positive polarity which disables the arc current control 32, thereby releasing switch S2, and simultaneously energizes the short circuit current control 30 restarting the cycle. In brief, $R_S$ is maintained in circuit during the short circuit time period provided such time period does not exceed the period set in reference timer 28. If the reference time period is exceeded and the short has not cleared $R_S$ is removed from the circuit. During the arc period both $R_S$ and $R_A$ are out of the circuit unless such arc time period exceeds the period set in reference timer 34 whereupon resistor $R_A$ is switched into the circuit until the short is reestablished.

The reference timers 28 and 34 respectively are conventional solid state timing circuits such as monostable multivibrators.

Figure 3:
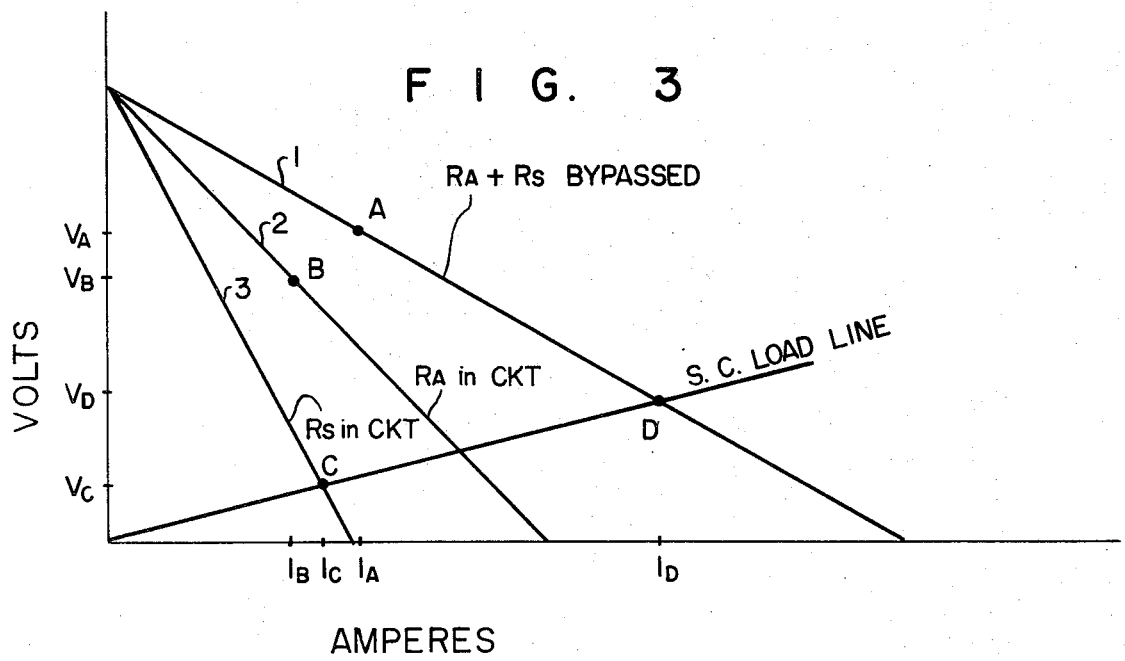
FIG. 3 is a volt-ampere characteristic curve illustrative of the invention.

FIG. 3 illustrates typical volt ampere characteristics for the power supply system of FIG. 2. Point A represents the normal arc operating point with both $R_A$ and $R_S$ out of circuit and with a current of $I_A$ and voltage $V_A$. Curve 1 was selected to produce the desired arc condition. At short circuit $R_S$ is switched into the circuit and the short circuit current drops to $I_C$ with point C representing the operating point. Point C is established at the intersection between the short circuit load line and the volt ampere curve 3. If the arc time period extends past the reference arc time period, the operating point would first move from point A on curve 1 to point B on curve 2 and then, once the short was established, to point C on curve 3. Likewise, if the short time duration extended past the set reference time period for the shorted condition the operating point would move from point C to point D and then upon reignition of the arc back to Point A. It should be understood that curves 1, 2 and 3 respectively can be modified with curves 2 and 3 interchanged or moved closer together or further apart through adjustment of resistors $R_A$ and $R_S$.

Moreover in keeping with the teachings of the present invention more than one resistor may be used for $R_S$ and/or $R_A$ respectively with associated switching circuits to achieve varying levels of current throughout the short and arc time intervals respectively as long as at the instant of metal transfer the current is low for minimum spatter.

Figure 4:
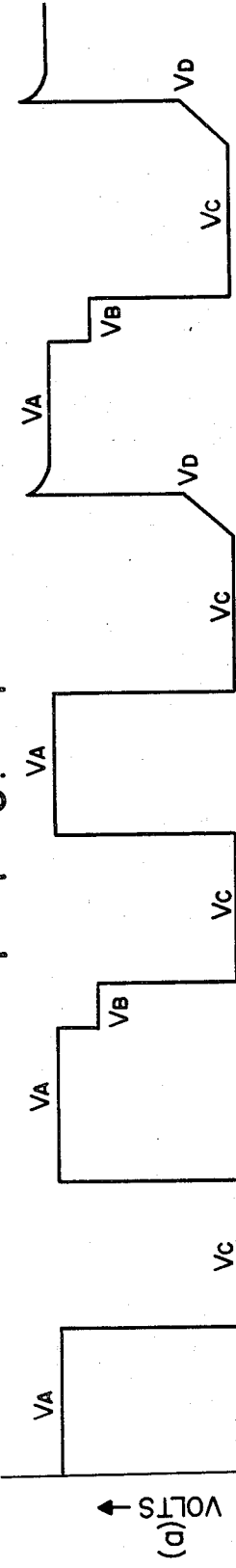
FIG. 4 (a–b) illustrates typical voltage and current traces versus time respectively for the system of the present invention.
Figure 4:
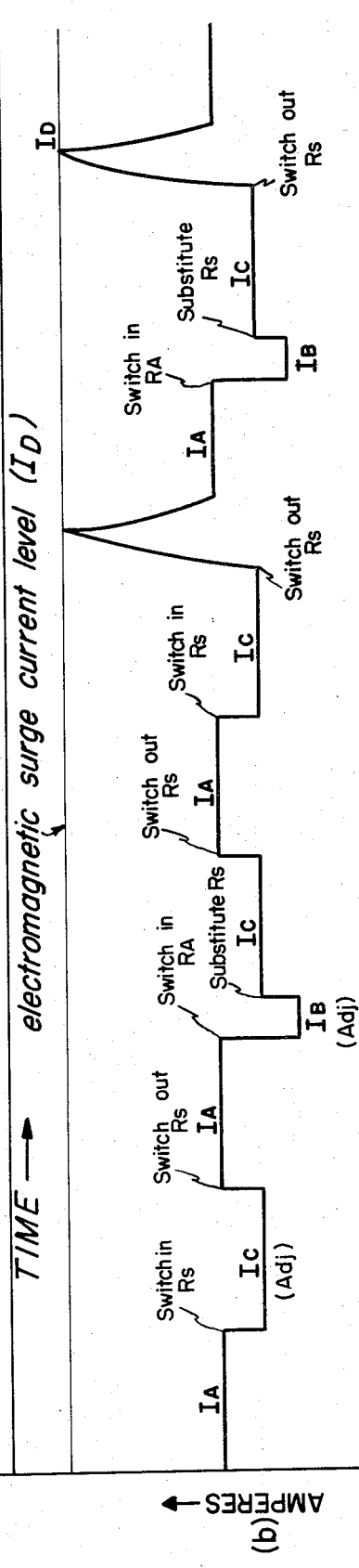
Figure 4:
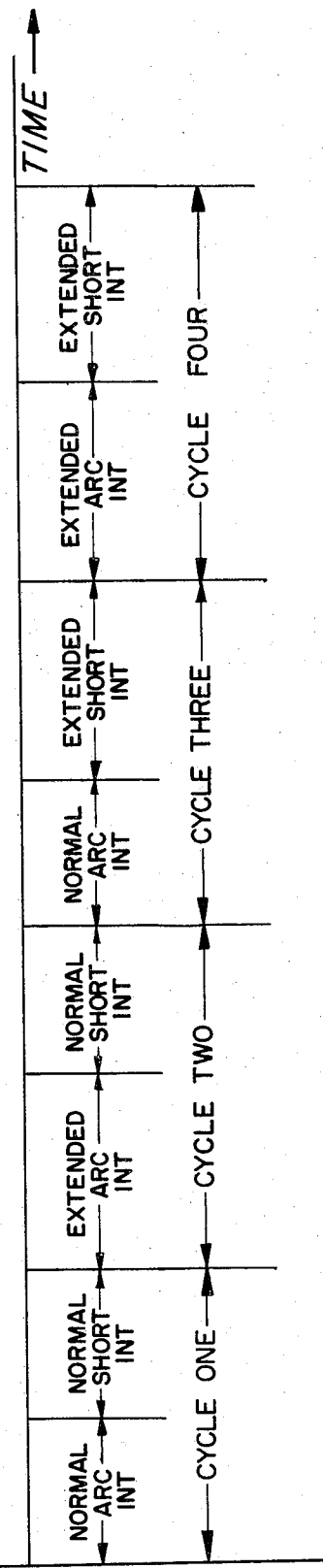

FIGS. 4 (a) and (b) depict the variations in voltage and current with time for a given setting of $R_A$ and $R_S$ which yield the volt-ampere characteristics illustrated in FIG. 3. Four time cycles have been illustrated with the cycles arbitrarily selected to provide a complete showing of all possible conditions. The voltage and current levels are not to scale.

In cycle one the arc current and voltage are determined by the operating point A in curve 1 of FIG. 3. The arc interval has been designated as "normal" where the electrode E contacts the workpiece W in a time period less than the reference arc time interval. As soon as the short occurs, $R_S$ is switched into the circuit establishing the current level $I_c$ which in this case is lower than the arc current level $I_A$. The current $I_c$ could have been set at any predetermined level by adjustment of $R_S$; provided however, $R_S$ is chosen such that the current is limited to below the electromagnetic surge current level $I_D$ at the instant of metal transfer.

The magnitude of the current $I_c$ primarily determines the amount of spatter produced since the energy level during short circuit is primarily $I^2R$ energy. Hence by lowering the short circuit current spatter can be significantly reduced and with a low enough short circuit current at metal transfer thereotically eliminated. However, by limiting the energy input during the short circuit interval, more energy is required during the arc interval if weld fluidity conditions are to be similar to that obtained with the conventional process. This is automatically achieved in the present process since the normal arc current is relatively high and somewhat constant assuming there is no auxiliary inductance connected into the circuit. This can also be done with more than one resistor $R_S$. Unlike the conventional process however, where the normal arc current will decay to bring the melt-off rate below the feed rate and thus assure a short circuit, the present process assures the shorted condition in an alternative manner as illustrated by cycle two in FIG. 4.

Cycle two assumes the condition where the energy input during an arc interval does not permit the melt-off rate to drop below the feed rate. This can be assumed to have occured when the arc interval extends past the reference arc time interval. The reference arc time interval may also be used to control the total energy input for the arc interval. As stated earlier, once the reference arc time interval is reached, resistor $R_A$ is switched into the circuit dropping the current level to $I_B$. This reduces the energy input and melt-off rate. The magnitude of $R_A$ will determine how long it then takes for a short to occur. If $I_B$ is low enough the short will occur almost immediately.

Cycle three assumes the condition where the transition from arc to short circuit is normal but where insufficient energy exists to clear the short. When the short circuit current is held to too low a value there is no assurance that the short will clear each and every cycle under the influence of primarily surface tension and gravity. If the short circuit time interval extends past the reference short circuit interval of time, resistor $R_S$ is removed and the short permitted to clear in the conventional manner with the delivered current increasing until the short clears. The delivered current can also be increased by pulse injection. Obviously, a short circuit current at the metal transfer instant of too low a magnitude requiring the short in each cycle to be cleared by increasing the delivered current would result in too high a spatter level.

Cycle four indicates the condition when both the arc and short intervals are extended.

From the foregoing description, it will be apparent that there has been provided an improved welding system which is capable of practicing the improved method of short circuit metal transfer arc welding employing any conventional welding power-supply capable of providing appropriate volt ampere characteristics and which system is equally applicable to either single or three phase operation. Moreover, although a preferred system for carrying out the method of the present invention has been described with reference to FIG. 2 other alternative techniques may be used to carry out the steps of the method. For example, the current levels can be controlled through magnetic amplifiers on the AC side of the power supply instead of the DC side as well as transistorized circuits or other known circuit methods to control the voltage and current levels at the arc terminals.

It is to be understood that a primary objective of reducing spatter is accomplished by insuring a limited current at the completion of each short circuit transfer. With this as the basic modus operandi the operator is given in addition the freedom and flexibility to adjust the heat input and to control weld puddle fluidity. Although the delivered current is increased to clear the short in those instances where the forces of gravity and surface tension are insufficient; such instances are quite occasional and do not seriously affect spatter. Moreover, although the reference times used herein represent the short and arc time intervals respectively they need only relate in time to the occurrence of the short and arc conditions respectively i.e., the reference times may be initiated in any manner and be of any duration unrelated to the actual short circuit and arc time durations respectively provided only that a consistant time relationship exists between the reference times and the start of the short and arc periods respectively.

I claim:

1. In a method of DC arc welding which includes forming an arc between a consumable electrode and a workpiece, continuously feeding the electrode toward the workpiece at a rate to permit the electrode to advance into physical contact with the workpiece, establishing a delivered current having a magnitude equal to the surge current level so as to cause the contacting portions to electromagnetically break open and impressing sufficient voltage across the electrode to workpiece to renew the arc whereby a short circuit interval and an arc interval is repetitively established in succession at naturally occurring periods, the improvement of which comprises;
   a. introducing, during said short circuit interval, an impedance in circuit with the electrode and workpiece of such magnitude that the maximum level of delivered current is limited to a level below the surge current level;
   b. generating a reference time signal at a time related to the occurrence of each short circuit;
   c. deenergizing said reference time signal upon the clearance of each short circuit;
   d. generating a control signal after said reference time signal has continued for a predetermined period of time in excess of said naturally short circuit period of time; and
   e. decreasing said impedance in response to said control signal by an amount sufficient to raise the delivered current to the surge current level.

2. In a method as defined in claim 1 wherein said reference time signal is generated at the occurrence of each short circuit.

3. In a method as defined in claim 1 further comprising the steps of:
   e. generating a detection signal in response to each arc interval;
   f. generating a reference arc time signal at a preselected time after the beginning of each arc interval;
   g. generating a second control signal in response to the concurrence of said reference arc time signal and said detection signal; and
   h. decreasing the delivered current level in response to said second control signal until a short occurs between said electrode and workpiece.

* * * * *